Jan. 17, 1967
C. S. REIS
3,299,433
ELECTROSENSITIVE RECORDING
Filed Oct. 21, 1964
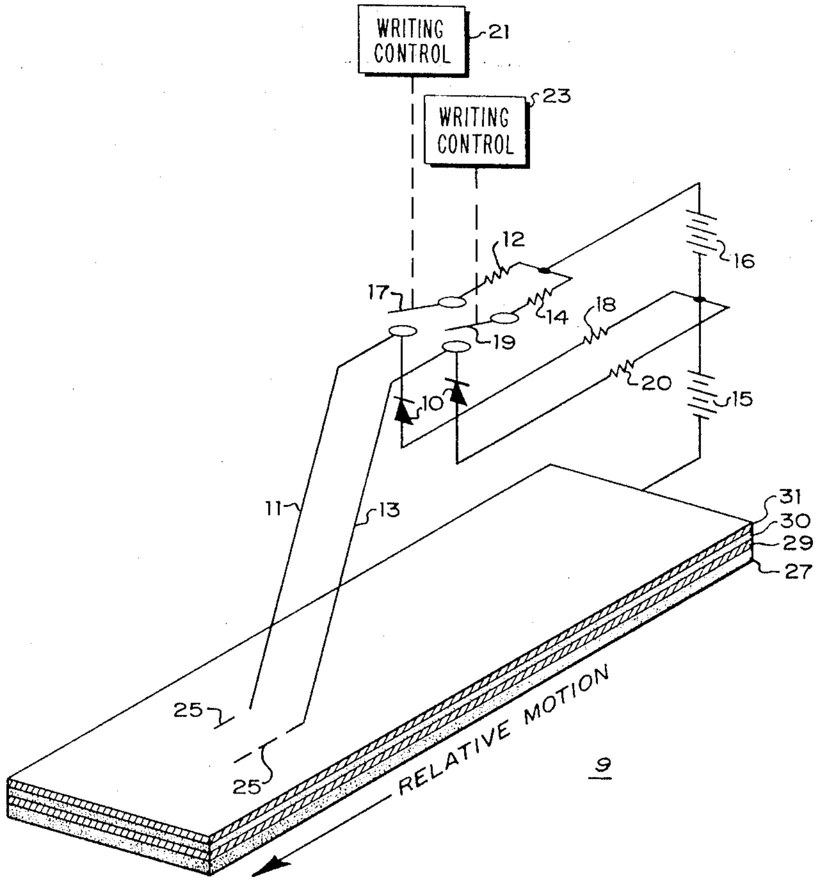
INVENTOR
CHARLES S. REIS
BY Q. C. Smith
ATTORNEY United States Patent Office 3,299,433
Patented Jan. 17, 1967

3,299,433
ELECTROSENSITIVE RECORDING

Charles S. Reis, Mountain View, Calif., assignor to Hewlett-Packard Company, Palo Alto, Calif., a corporation of California Filed Oct. 21, 1964, Ser. No. 405,444
3 Claims. (Cl. 346—74)

This invention relates to the method and means for recording on an electrosensitive recording medium with writing signals above a preselected threshold level. Recording apparatus of this type is well suited for use with low voltage writing signals which need only increase a bias signal having a value below the threshold level to a value above the threshold level to produce a recording.

It is an object of the present invention to provide an improved electrosensitive recording medium which has a preselected threshold level below which no recording is produced and above which a recording is produced.

It is another object of the present invention to provide an electrosensitive recording medium which changes recording characteristics abruptly for writing signals applied thereto above a selected level.

It is another object of the present invention to provide a method for recording on an electrosensitive medium.

It is still another object of the present invention to provided apparatus for recording on electrosensitive recording medium.

In accordance with the illustrated embodiment of the present invention, an electrosensitive recording medium is provided which produces a record only in response to applied writing signals which exceed a preselected threshold value. This is accomplished by coating a heavily conductive base layer with a thin insulating film which breaks down at the desired threshold value of writing signal. This insulating film is coated with a layer of heat-sensitive material such as a dye of the classes known as azo or diazo dyes in a suitable binder which is made electrically conductive by the addition of metallic impurities or particles or the like. A writing signal applied to the recording medium through a surface-contacting electrode having an amplitude which exceeds the threshold level thus breaks down the insulating film and is conducted through the surface layer including the heat-sensitive material to the base layer. This causes local heating of the surface layer in the regions of high current density under the surface area of the contacting electrode which, in turn, causes the dye or other heat-sensitive material to change chemical composition and thereby produce a contrasting color change in the record region.

Other and incidental objects of the present invention will be apparent from a reading of this specification and an inspection of the accompanying drawing which shows a pictorial diagram of the recording medium and recording apparatus of the present invention.

Referring to the drawing, relative motion between the record medium 9 and the surface-contacting electrodes 11, 13 may be produced by moving the recording medium 9 and electrodes 11, 13 at dissimilar velocities. Bias signals from source 15 having values below the preselected recording threshold level of the recording medium 9 are applied to the electrodes 11, 13 disposed in contact with the surface of recording medium 9 through resistors 18 and 20 and diodes 10. Writing signals from source 16 are combined with the bias signals from source 15 through resistors 12, 14 and the switches 17, 19 which are actuated by writing controls 21, 23. Diodes 10 block reverse current flow and prevent the writing signal from source 16 from being attenuated by the resistors 12, 14, 18 and 20. Contrasting lines or marks 25 are produced on the medium 9 in response to the applied signals exceeding the threshold value as the electrodes pass along the surface.

The electrosensitive recording medium 9 is prepared according to one embodiment of the present invention as follows: an aluminum layer 29 is disposed on suitable backing material 27 such as paper or plastic film using well-known methods. A thin insulating film 30 is formed on the aluminum layer 29. The breakdown of dielectric strength of this insulating film establishes the threshold level of writing signal. This insulating film may be aluminum oxide formed by passing the aluminum-coated backing material through an oxidizing atmosphere at elevated temperature for a selected time or may be any other suitable insulating material such as plastic, lacquer or the like which may be applied by conventional spraying or roller coating techniques. The thickness of this coating may readily be selected for a given required threshold level of writing signal from the knowledge of its dielectric strength.

A surface coating 31 including a heat-sensitive material is deposited over the insulating film 30 to form the electrosensitive layer. This surface coating may be formed according to one embodiment of the present invention by combining 100 grams of zinc oxide which acts as a white pigment as well as an electrical conductor, 62.5 grams of a suitable binder such as Lucite No. 2040, 137 milliliters of a solvent such as xylene or toluene and 25 grams of heat-sensitive substance formulated using four parts by weight of a heavy metal salt such as nickel acetate or nickel stearate to one part by weight of an alkaline earth metal sulfide such as calcium sulfide, barium sulfide or the like.

Other heat-sensitive substances may be formulated using 7.5 parts by weight of nickel palmitate, 2.5 parts by weight of barium or calcium sulfate and 1 part by weight of stearic or palmitic acid. Still another heat-sensitive substance may be formulated using 5 parts by weight of a stearate of metal such as cobalt, copper, lead, magnesium, manganese, mercury, nickel or zinc and 1 part by weight of diphenylcarbozone. Of course, it will be appreciated by those skilled in the art that any heat-sensitive material including azo, diazo and leuco dyes (the latter dye being less light-sensitive than the azo and diazo dyes) may be used in the surface coating material.

This coating material is rolled onto the insulating film 30 to a wet thickness of about 3 mils and is dried at a temperature below the threshold value at which the color transition takes place. The surface coating 31 thus formed comprises a matrix of heat-sensitive and electrically conductive materials which are bonded to the insulating film 30.

Signals applied to the surface coating 31 through electrode 11, 13 having amplitudes which are sufficient to break down the insulating film 30 cause currents to flow in this surface coating 31 in the region beneath the contact areas of the electrodes with sufficient current density to elevate the temperature of these local areas of the surface coating 31. This causes the heat-sensitive material in the surface coating to undergo a change of composition, thereby producing color changes in the record areas beneath the electrode contact areas. In a typical application, the recording medium of the present invention may be biased below the threshold value and the actual recording may be produced using transistor circuitry which need only switch a few volts to increase the writing signal beyond the threshold value. Thus, a writing signal above the threshold value can produce a highly contrasting record in the regions of electrode contact using writing signals of very low power levels per electrode white a writing signal below the threshold value produces no record at all.

I claim:

1. Recording apparatus comprising:
a conductive base layer;
an insulating film on said conductive base layer having a predetermined dielectric and thickness to provide a selected voltage breakdown strength; and
an electrically conductive surface layer disposed on said insulating film and including a heat-sensitive material which changes color at elevated temperatures;
whereby a writing signal in excess of said voltage breakdown strength applied to said surface layer provides current flow therethrough with sufficient current density to elevate the temperature of local regions thereof to produce a color change in such regions.

2. Recording apparatus comprising:
a non-conductive backing material;
a conductive layer on said backing material;
an insulating film on said conductive layer having a predetermined dielectric and thickness to provide a selected voltage breakdown strength;
an electrically conductive surface layer disposed on said insulating film and including a heat-sensitive material which changes color at elevated temperatures;
a source of writing signal; and
an electrode connected to said source and disposed in contact with said surface layer for applying a writing signal thereto;

whereby a writing signal in excess of said voltage breakdown strength applied to said surface layer provides current flow therethrough with sufficient current density to elevate the temperature of local regions thereof for producing a color change in such regions.

3. Electrosensitive recording medium comprising:
a backing material having negligible electrical conductivity;
a metallic layer disposed on said backing material;
an insulating film on said layer; and
a conductive coating on said film;
said coating including a heat-sensitive compound selected from the group of azo and diazo dyes which changes color at elevated temperatures.

References Cited by the Examiner

UNITED STATES PATENTS

| | | | |
|---|---|---|---|
| 2,294,146 | 8/1942 | Wise | 204—2 |
| 2,315,362 | 3/1943 | Wise et al. | 178—6.6 |
| 2,664,044 | 12/1953 | Dalton | 346—135 X |
| 2,726,168 | 12/1955 | Roddin et al. | 117—36 |
| 2,833,677 | 5/1958 | Baumlein | 117—217 |

RICHARD B. WILKINSON, *Primary Examiner.*

J. W. HARTARY, *Assistant Examiner.*